W. L. IRELAND.
INFLATION DEVICE FOR MULTIPLE CHAMBERED TIRES.
APPLICATION FILED OCT. 5, 1915.

1,188,276.

Patented June 20, 1916.

Inventor
W. L. Ireland

Witnesses

By Victor J. Evans
Attorney

UNITED STATES PATENT OFFICE.

WILLIAM L. IRELAND, OF GRAND LEDGE, MICHIGAN.

INFLATION DEVICE FOR MULTIPLE-CHAMBERED TIRES.

1,188,276.   Specification of Letters Patent.   Patented June 20, 1916.

Application filed October 5, 1915. Serial No. 54,217.

*To all whom it may concern:*

Be it known that I, WILLIAM L. IRELAND, a citizen of the United States, residing at Grand Ledge, in the county of Eaton and State of Michigan, have invented new and useful Improvements in Inflation Devices for Multiple-Chambered Tires, of which the following is a specification.

This invention relates to inflation devices for multiple chambered tires, the object in view being to produce means whereby a tire may be reinflated after it has been subjected to a puncture or blow out, without the necessity of repairing the tire and only requiring the use of a pump to reinflate the same.

A further object of the invention is to provide a novel construction of valve whereby the air under pressure may be forced into either chamber of the tube.

With the above and other objects in view, the invention consists in the novel construction, combination and arrangement of parts, as herein described, illustrated and claimed.

Figure 1:
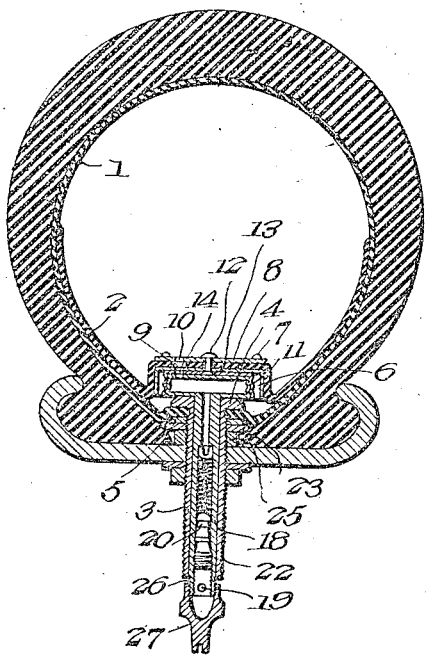
Figure 2:
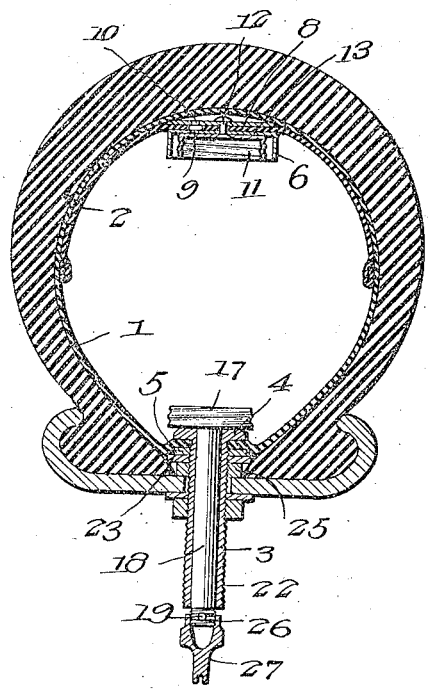
Figure 3:
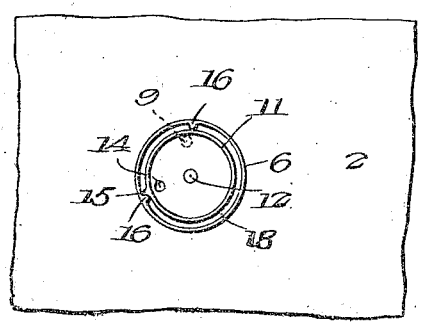
Figure 4:

In the accompanying drawings:—Figure 1 is a cross section through the tube of this invention showing the first position of the parts. Fig. 2 is a similar view showing the second position of the parts after the tread portion of the tube has been punctured or fractured. Fig. 3 is a fragmentary inside face view of the partition showing also the valve with the inner stem and the head thereof detached. Fig. 4 is a face view of the chambered head.

Referring to the drawings 1 designates an inner tube such as is used for inflating pneumatic tires. In carrying out the present invention a partition 2 preferably of rubber extends throughout the length of the tube within the latter and is secured in an air tight manner along its longitudinal edges to the inner surface of the tube 1 along diametrically opposite lines. The partition 2 is made of sufficient fullness to enable it to conform either to the inner or rim portion of the tube or to the outer or tread portion thereof so that when the tube is inflated, the parition 2 will lie in close contact either with the tread portion of the tube or the rim portion thereof.

The tube 1 has connected to the inner face thereof an outer valve tube casing 3 provided at its inner end with a head or flange 4 which bears against the inside surface of the tube and also has a washer 5 surrounding the same and bearing against the outer surface of the tube as shown. The partition 2 has fastened to the inner face thereof or that face which is disposed toward the rim of the wheel, a valve casing 6 which is in the form of a shallow cylindrical cup, the base wall of said cup being fastened by rivets or other fasteners indicated at 7 to a disk-shaped plate 8 which bears against the opposite face of the partition, the said parts being closely united to prevent leakage of air. The base wall of the cup-shaped casing 6 is provided with a perforation 9 which is in line with a corresponding perforation 10 in the plate 8.

Within the casing 6 is mounted a partially rotatable or oscillatory valve 11 which has a pivotal connection at 12 with the base of the casing 6. The base wall 13 of the valve is provided with a perforation 14 movable into and out of alinement with the perforations 9 and 10 above referred to. The valve 11 is provided on the periphery thereof with a stop 15 which is movable between a pair of stops 16 on the interior of the casing 6, said stops being so arranged that when the valve 11 is turned in one direction, the perforations 9, 10 and 14 will register with each other and when the valve 11 is turned in the other direction against the other stop 16, the perforation 14 of the valve will be moved out of alinement with the perforations 9 and 10 of the valve casing 6 and plate 8.

The valve 11 which is in the form of a shallow cylinder is internally threaded to receive an externally threaded and chambered head 17 on the inner end of an inner valve tube 18 which extends through the outer valve tube 3 and is rotatable and slidable therein. The inner valve tube 18 extends outwardly beyond the outer extremity of the tube 3 where it is shown as provided with diametrically opposite perforations 19 through which a pin may be inserted for rotating the tube 18 to turn the head 17 and the valve 11 in order to shift the perforation 14 of the valve in the manner and for the purpose above stated. The inner valve tube 18 contains a check valve 20, preferably of the Schraeder type such as is now commonly used in connection with inner tubes. The air forced past the valve 20 enters the chambered head 17 and passes outwardly therefrom through an arcuate slot 21 which is of sufficient length to register with the perforations 9 and 10 of the casing 6 and the plate 8 irrespective of the position of the valve 11 as it is moved from one of the stops 16 to the other stop 16. It will be understood that by sufficiently turning or revolving the inner valve tube 18, the chambered head 17 may be unscrewed from the valve 11.

The valve tube casing 3 is threaded as shown at 22 to receive the usual clamping washer 23, the smaller washer 5 located between the washer 23 and the tire tube, and the nut 25 which is threaded on the tube 3 and adapted to be screwed up tightly against the washer 23, the last named parts being of the usual construction and arrangement. The outer extremity of the tube 18 is threaded as shown at 26 to receive the usual threaded cap 27.

From the foregoing description, taken in connection with the accompanying drawings, the operation of the device hereinabove described will now be understood. Primarily, the valve 11 is turned so that the air under pressure passes to the outer side of the partition 2 thereby forcing said partition inwardly against the rim portion of the tube 1. Should a puncture occur in the outer tread portion of the tube where nine-tenths of the punctures usually occur, upon the collapse of the tire, the valve 11 is turned so as to cut off the perforations 9 and 10 and upon disconnecting the chambered head of the inner valve tube 18 from the valve 11, the air then pumped into the tube will be confined between the rim portion of the tube and the partition 2. The latter will be forced outwardly against the tread portion of the tube and will in effect form another tube capable of holding the air under the full given pressure without the necessity of repairing the tube. This avoids the trouble and annoyance of taking out an inner tube, mending the same and returning said tube to its position within the outer case, this being a particularly valuable feature on the road as it saves valuable time and a considerable amount of work on the part of the driver of the machine. It is only necessary to adjust the cut-off valve connected with the partition 2 and reinflate the tube. It furthermore avoids liability of pinching another tube which is used to replace the punctured tube as the position of the original tube is not in any way disturbed.

Having thus described my invention, I claim:—

1. The combination with an inner tube for pneumatic tires, of a flexible partition therein extending longitudinally of the air space and united along its marginal edges to the inner tube along substantially diametrically opposite lines, means including a cut-off valve adapted to be positioned to admit air under pressure to the outer side of said partition while excluding air from the inner side thereof, said valve comprising an outer valve tube fastened directly to the tire tube casing and an inner valve tube containing an air check valve, and extending through the outer valve tube said cut-off valve being carried by said partition and controlled by said inner valve tube casing.

2. The combination with an inner tube for pneumatic tires, of a flexible partition therein extending longitudinally of the air space and united along its marginal edges to the inner tube along substantially diametrically opposite lines, means including a cut-off valve adapted to be positioned to admit air under pressure to the outer side of said partition while excluding air from the inner side thereof, said valve comprising an outer valve tube casing fastened directly to the tire tube casing, an inner valve tube containing an air check valve and extending through the outer valve tube casing, said cut-off valve being carried by said partition and controlled by said inner valve tube casing, and a chambered and ported head at the inner extremity of said inner valve tube having a threaded and rotatable engagement with the cut-off valve.

In testimony whereof I affix my signature in presence of two witnesses.

WILLIAM L. IRELAND.

Witnesses:
G. H. BEARUP,
WALTER H. EAMES.